(12) United States Patent
Cunha et al.

(10) Patent No.: US 11,093,764 B2
(45) Date of Patent: Aug. 17, 2021

(54) AVAILABLE PARKING SPACE DETECTION LOCALIZATION USING HISTORICAL AGGREGATION SHIFTING

(71) Applicant: Robert Bosch GmbH, Stuttgart (DE)

(72) Inventors: Carlos Cunha, Mountain View, CA (US); Ruobing Chen, Mountain View, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 16/023,529

(22) Filed: Jun. 29, 2018

(65) Prior Publication Data
US 2020/0005055 A1    Jan. 2, 2020

(51) Int. Cl.
*G06K 9/00* (2006.01)
*B60R 1/00* (2006.01)
*G06F 16/29* (2019.01)

(52) U.S. Cl.
CPC ............ *G06K 9/00812* (2013.01); *B60R 1/00* (2013.01); *G06F 16/29* (2019.01); *B60R 2300/806* (2013.01)

(58) Field of Classification Search
CPC ... G06K 9/00812; G06F 16/29; G06F 16/909; B60R 1/00; B60R 2300/806
See application file for complete search history.

(56) References Cited

U.S. PATENT DOCUMENTS

| 10,157,543 | B1* | 12/2018 | Shah | G08G 1/04 |
| 2016/0171893 | A1* | 6/2016 | Chen | G08G 1/167 |
| | | | | 701/300 |
| 2017/0267233 | A1* | 9/2017 | Minster | B62D 15/02 |

FOREIGN PATENT DOCUMENTS

| DE | 102004062021 A1 | 7/2006 |
| DE | 102008028550 A1 | 12/2009 |
| DE | 102009028024 A1 | 2/2011 |
| DE | 102013018721 A1 | 6/2014 |
| DE | 102014009627 A1 | 11/2014 |
| WO | WO2012/019628 A1 | 2/2012 |

* cited by examiner

*Primary Examiner* — Farzana Hossain
(74) *Attorney, Agent, or Firm* — Norton Rose Fulbright US LLP; Gerard Messina; Aaron Grunberger (57) ABSTRACT

A method for object detection and parking spot localization includes receiving data corresponding to detected objects located within a street segment, the data being ascertained by an ascertaining vehicle driving through the street section, determining a detected object distribution, shifting the detected object distribution, and generating a parking map of available parking spots on the street segment based on a parking region distribution and the shifted detected object distribution. The method includes receiving the data, determining the detected object distribution, and shifting of the detected object distribution, for example each time at least one of the at least one ascertaining vehicle drives through the street section.

11 Claims, 6 Drawing Sheets

AVAILABLE PARKING SPACE DETECTION LOCALIZATION USING HISTORICAL AGGREGATION SHIFTING

FIELD OF THE INVENTION

The present invention relates to a method of object detection localization using block detection shifting to accurately assess whether a detected available parking space is a valid parking space or is actually an invalid parking space, such as a driveway or intersection, that has been the subject of a false detection as a valid parking space. Further aspects of the present invention relate to a computer program, to a central computer facility, and to a device configured to carry out the method. Subject matter of the present application relates to subject matter in U.S. patent application Ser. No. 15/135,194, filed on Apr. 21, 2016 and issuing on Aug. 29, 2017 as U.S. Pat. No. 9,747,791, the entire content of which is hereby incorporated by reference herein.

BACKGROUND

Open parking areas for vehicles can be detected using distance based sensors (e.g., ultrasonic sensors, laser sensors, radar sensors, stereo video cameras, etc.). Such methods are known for example from DE 10 2004 062 021 A1, DE 10 2009 028 024 A1, and DE 10 2008 028 550 A1.

A variety of driver assistance systems are used in the automotive field, which are intended to assist the driver with carrying out various driving maneuvers. These include, for example, parking assistance systems which, using sensors assigned to the vehicle, detect the surroundings, ascertain possible parking spaces in the surroundings, and assist the driver during parking.

DE 10 2014 009 627 A1 discusses a method for reporting a free parking spot for a vehicle. Free parking spaces are identified using vehicle-internal sensors and based on attributes such as length, width, height, angle, type, and geographical position. A free parking space is also established when a previously occupied parking spot is cleared. Additionally, further sensors can be used to identify traffic signs, for example to consider pieces of information from signage. Moreover, a linkage to a digital road map is additionally provided to preclude the use of areas situated too close to an intersection, for example. Relevant parking spots are reported to other vehicles, with either a direct communication between two vehicles or a central server being used for this purpose.

DE 10 2013 018 721 A1 discusses a method for identifying at least one parking spot for a motor vehicle, the method creating an occupancy grid into which sensor data of at least one distance-measuring sensor are entered. Based on the sensor data, objects are identified and subsequently classified, for example as a car class and as a non-car class. This makes it possible to identify a gated entrance, for example, since generally no parking automobile is identified in the vicinity of such a gated entrance.

WO 2012/019628 A1 discusses a method for identifying parking spaces based on collected GPS data. GPS data of a navigation system are superimposed on a digital map, and clusters that point to possible parking spaces are displayed. Data on the parking space, such as the type of the parking space or the average parking duration, are extracted from the collected data.

Several techniques exist to improve spatial localization of objects detected by sensors. For example, spatial localization can be improved using odometry and accelerometry information, technologies which are available in many vehicles and mobile devices. The most common class of techniques for improving localization is known as Simultaneous Localization and Mapping ("SLAM").

SUMMARY

Sensors, e.g., of a vehicle traveling on the road, can be used for detecting objects along a road, to thereby generate a map of where there are open areas that are available for parking. For example, vehicles can detect the objects, identify open areas as available parking spots, and transmit data to a cloud, e.g., a central server, data identifying the detected available parking spots. However, many of the detected available parking spots are false positives, where an open area identified as an available parking area is actually not an area in which it is permissible to park, e.g., where the area identified as an available parking spot is actually a driveway. Further, the busier a street is, the more false positives that are generated, often even as much as 100 false positives to 1 true positive.

To identify whether a detected open area is an available parking area or is rather an open area in which parking is impermissible, the detected open areas can be correlated to a parking map that identifies regions in which parking is permissible when unoccupied and areas in which parking is impermissible even when not occupied. Thus, detected unoccupied areas are disregarded if their locations are where the parking map indicates parking is impermissible, but are flagged as available parking areas if their locations are where the parking map indicated parking is permissible.

However, false positives can occur even where occupancy detections are correlated to a parking map due to inaccuracies of the localization of the detections. For example, sensors may inaccurately correlate a detected area to its actual real space location and/or to an area of the parking map.

Embodiments of the present invention reduce false positives caused by such inaccuracies in localization by comparing a pattern of the locations identified as available parking spaces to a pattern of allowed parking areas identified in a parking map. In this regard, if something is off, with respect to correlations of detections to the parking map, at the beginning of a street segment, every other detection will be off by a similar amount. Hence, if the sensor detects a vehicle parked at a location where parking is not allowed according to the parking map, it is assumed that the problem is due to a localization error. According to example embodiments, corrections are performed to shift detected vehicles in areas identified by the parking map as an impermissible parking area to areas identified by the parking map as permissible, resulting in a similar correction to all location identifications by the sensor, including the locations of every vehicle detected by the sensor on the same street segment and the locations of every available parking spot detected by the sensor on the same street segment. (In an example, the corrections are performed on a street segment by street segment basis.) Then, with the corrected detected open spots, the system more accurately identifies whether the respective open spots are available parking spots or impermissible parking areas, such as driveways, where the localized open area correlates to an impermissible parking area on the parking map.

Example embodiments of the present application provide methods and systems for object detection localization using historical aggregation shifting to identify available parking spots.

A parking area map can be obtained which identifies areas along a street segment in which parking is permissible. A plurality of vehicles can travel through the street segment and, during the traveling, detect via sensor objects located on the street segment. There may be inaccuracies in the assigned positions of the detected objects. According to an example embodiment, the system corrects these inaccuracies by shifting them so that respective patterns of the detected objects by respective ones of the detecting vehicles more closely match the pattern of known parking areas.

According to an example embodiment of the present invention, a method for object detection localization includes, receiving, by processing circuitry and from at least one ascertaining vehicle driving through a street segment, data from at least one sensor of the at least one ascertaining vehicle corresponding to detected objects in the street segment; determining, by the processing circuitry, a detected object distribution based on the received data; shifting, by the processing circuitry, the detected objection distribution based on a predefined parking region distribution and the detected object distribution; and generating, by the processing circuitry, a parking map of presently available parking spots on the street segment based on the parking region distribution and the shifted detected object distribution. In an example embodiment, the receiving of the data, the determining of the detected object distribution, and the shifting of the detected object distribution are performed each time at least one of the at least one ascertaining vehicle drives through the street section.

In an example embodiment, the data are ascertained using distance sensors situated on the at least one ascertaining vehicle.

In an example embodiment, the method includes calculating, based on a score function, a score corresponding to the parking region distribution and the detected object distribution. For example, the shifting of the detected object distribution is based on a minimization of the calculated score.

In an example embodiment, the parking region distribution is a histogram having 1) a bin width (W); 2) a length (L) corresponding to a length of the street segment; 3) a height of one (1) inside allowed parking regions; and 4) a height of zero (0) outside allowed parking regions. In an example embodiment, the detected object distribution is a histogram having 1) a bin width (W); 2) a length (L) corresponding to the length of the street segment; 3) a height of one (1) where an object is detected; and 4) a height of zero (1) where no object is detected. For example, the bin width is equal to 1 meter.

In an example embodiment, the score function is defined as $$\sum \frac{(T_i - O_i)^2}{L},$$

where $T_i$ represents an i-th bin from the parking region histogram; $O_i$ represents an i-th bin from the detected object histogram; L represents the length of the street segment; and the score function is calculated over the length of the street segment.

In an example embodiment, the method includes calculating a regularized score corresponding to the parking region distribution and the detected object distribution. For example, the regularized score is calculated using a Ridge Regression model.

Thus the regions in which objects are detected are shifted so that their pattern more closely matches the pattern of regions in which parking is permissible. The method also includes, based on the shift of the regions in which objects have been detected, shifting, by the processing circuitry, the regions detected as being unoccupied; and generating, by the processing circuitry, a map of presently available parking on the street segment based on the shifted detected object distribution.

Example embodiments of the present invention relate to a method for object detection localization includes receiving, by processing circuitry and from at least one ascertaining vehicle driving through a street segment, data from at least one sensor of the at least one ascertaining vehicle and corresponding to detected objects in the parking region; shifting, by the processing circuitry, the detected object distribution based on a historical distribution of objects detected in the street segment; and generating, by the processing circuitry, a parking map of presently available parking spots on the street segment based on the shifted detected object distribution. For example, the shifting of the detected object distribution is performed each time at least one of the at least one ascertaining vehicle drives through the street section.

Example embodiments of the present invention relate to a server system including a processing unit that includes processing circuitry configured to receive, from at least one ascertaining vehicle driving through a street segment, data from at least one sensor of the at least one ascertaining vehicle corresponding to detected objects in the street segment; determine a detected object distribution based on the received data; shift the detected object distribution based on a parking region distribution and the detected object distribution; and generate a parking map of presently available parking spots on the street segment based on the parking regions and the shifted detected object distribution.

Example embodiments of the present invention relate to a non-transitory computer readable medium on which are stored instructions that are executable by a computer processor and that, when executed by the processor, cause the processor to perform a method, the method including: receiving, from at least one ascertaining vehicle driving through a street segment, data from at least one sensor of the at least one ascertaining vehicle corresponding to detected objects in the street segment; determining a detected object distribution based on the received data; shifting the detected object distribution based on a parking region distribution and the detected object distribution; and generating a parking map of available parking spots on the street segment based on the parking regions and the shifted detected object distribution.

These and other features, aspects, and advantages of the present invention are described in the following detailed description in connection with certain exemplary embodiments and in view of the accompanying drawings, throughout which like characters represent like parts. However, the detailed description and the appended drawings describe and illustrate only particular example embodiments of the invention and are therefore not to be considered limiting of its scope, for the invention can encompass other equally effective embodiments.

Any embodiment of any of the disclosed compositions and/or methods can consist of, consist essentially of, comprise, include, contain, and/or have any of the described elements and/or features and/or steps.

The use of the word "a" or "an" when used in conjunction with the term "comprising" in the claims and/or the specification can mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features, and advantages of the present invention will become apparent from the following detailed description and the referenced drawings. It should be understood, however, that the detailed description, drawings, and the examples, while indicating specific embodiments of the invention, are given by way of illustration only. Additionally, it is contemplated that changes and modifications within the spirit and scope of the invention will become apparent to those skilled in the art from this detailed description.

DETAILED DESCRIPTION

Various features and advantageous details are explained more fully with reference to the non-limiting embodiments that are illustrated in the accompanying drawings and detailed in the following description. However, the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided for a thorough understanding of the disclosed embodiments. One of ordinary skill in the relevant art will recognize, however, that the invention can be practiced without one or more of the specific details, or with other methods, components, materials, and so forth. For example, well-known structures, materials, or operations are not shown or described in detail to avoid obscuring aspects of the invention.

Figure 1:
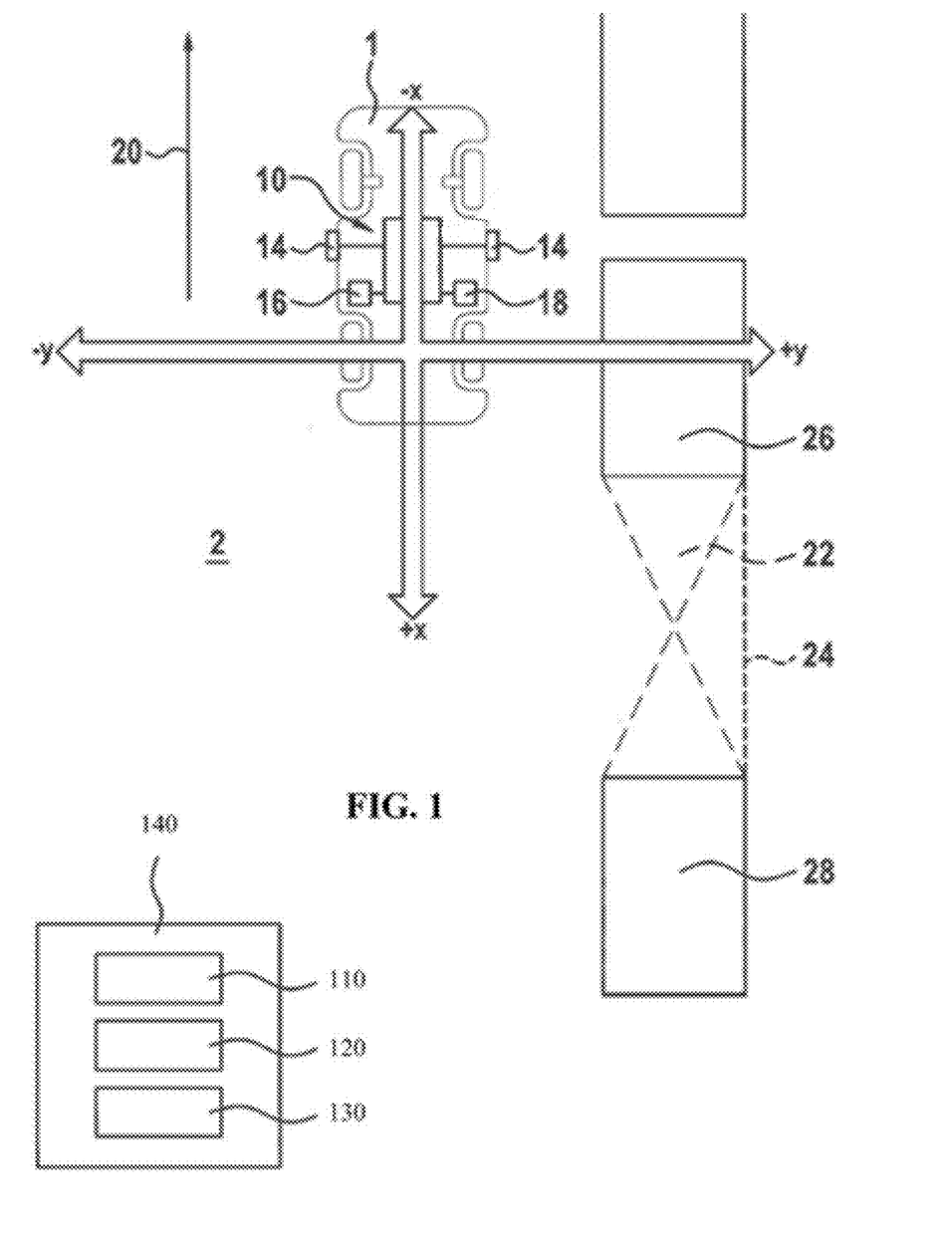
FIG. 1 is a diagram illustrating object detection by a vehicle according to an example embodiment of the present invention.

FIG. 1 shows ascertaining vehicle 1 that is moving along street 2 in driving direction 20. Ascertaining vehicle 1, includes, for example, device 10 for assisting the driver, which in turn includes surroundings sensors 14 for detecting possible parking spaces 22 in the surroundings of vehicle 1. Surroundings sensors 14 can be, for example in the specific embodiment illustrated in FIG. 1, distance sensors oriented to the sides of vehicle 1, one surroundings sensor 14 each being situated on the left vehicle side and on the right vehicle side. In another example, surroundings sensors can be configured as ultrasonic sensors, laser sensors, radar sensors, or stereo video cameras, etc.

When ascertaining vehicle 1 passes by possible parking space 22, rear delimitation 28, front delimitation 26, and lateral delimitation 24 can be ascertained via surroundings sensors 14. For example, delimitation 28 corresponds to a first reference object, delimitation 26 corresponds to a second reference object, and lateral delimitation 24 corresponds to a lateral reference.

Data corresponding to rear delimitation 28, front delimitation 26, and lateral delimitation 24 can be transmitted together with an indication about their positions to a central computer facility 140 via an arrangement for communication 18, e.g., a wireless communication interface. The position of possible parking space 22 can be determined in that initially its position relative to vehicle 1 is ascertained, and additionally the position of vehicle 1 can be determined using satellite navigation. Device 10 can additionally include a GPS receiver 16 for this purpose.

Central computer facility 140 includes an arrangement 110, e.g., a wireless communication interface, for communicating with ascertaining vehicles. The information can be stored in a database 120. Furthermore, a processing unit 130 can be assigned to or included in central computer facility 140.

Figure 2:
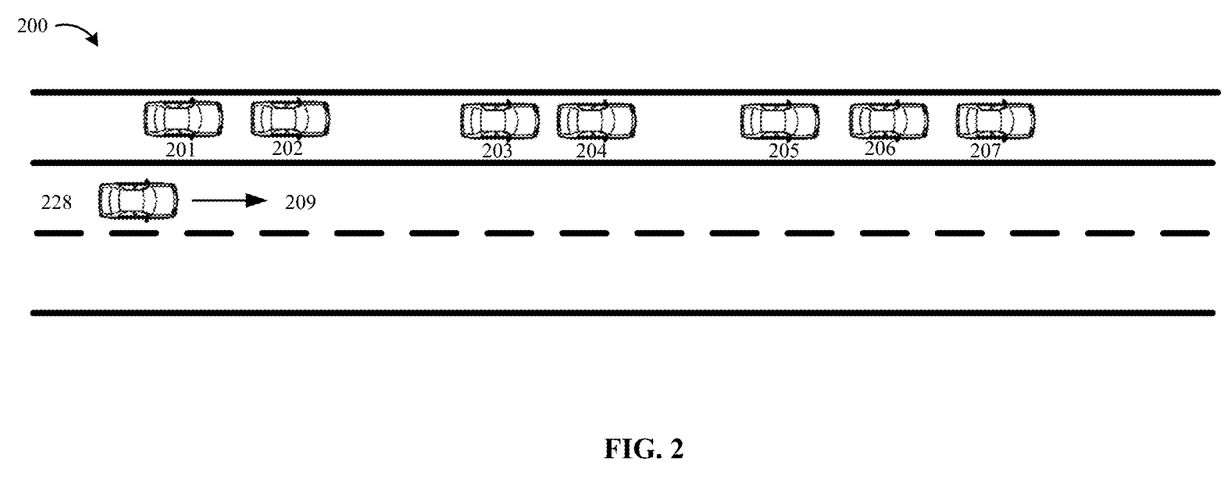
FIG. 2 is a diagram illustrating a scenario where a vehicle performs detections according to an example embodiment of the present invention.

Referring now to FIG. 2, street section 200 is shown with vehicles 201-207. As ascertaining vehicle 228 drives down street section 200 in direction 209, ascertaining vehicle 228 detects, inter alia, the presence of vehicles 201-207. Ascertaining vehicle 228 can detect these objects, for example, using a surroundings sensor, which can be, for example, a distance sensor (e.g., ultrasonic sensors, laser sensors, radar sensors, stereo video cameras, etc.). Data collected by ascertaining vehicle 228 corresponding to the detected objects can be collected and transmitted each time ascertaining vehicle 228 drives down street section 200. The data collected by ascertaining vehicle 228 can correspond to the length, height, width, etc. of vehicles 201-207. The collected data can be transmitted to central computer facility 140 shown in FIG. 1.

Figure 3:
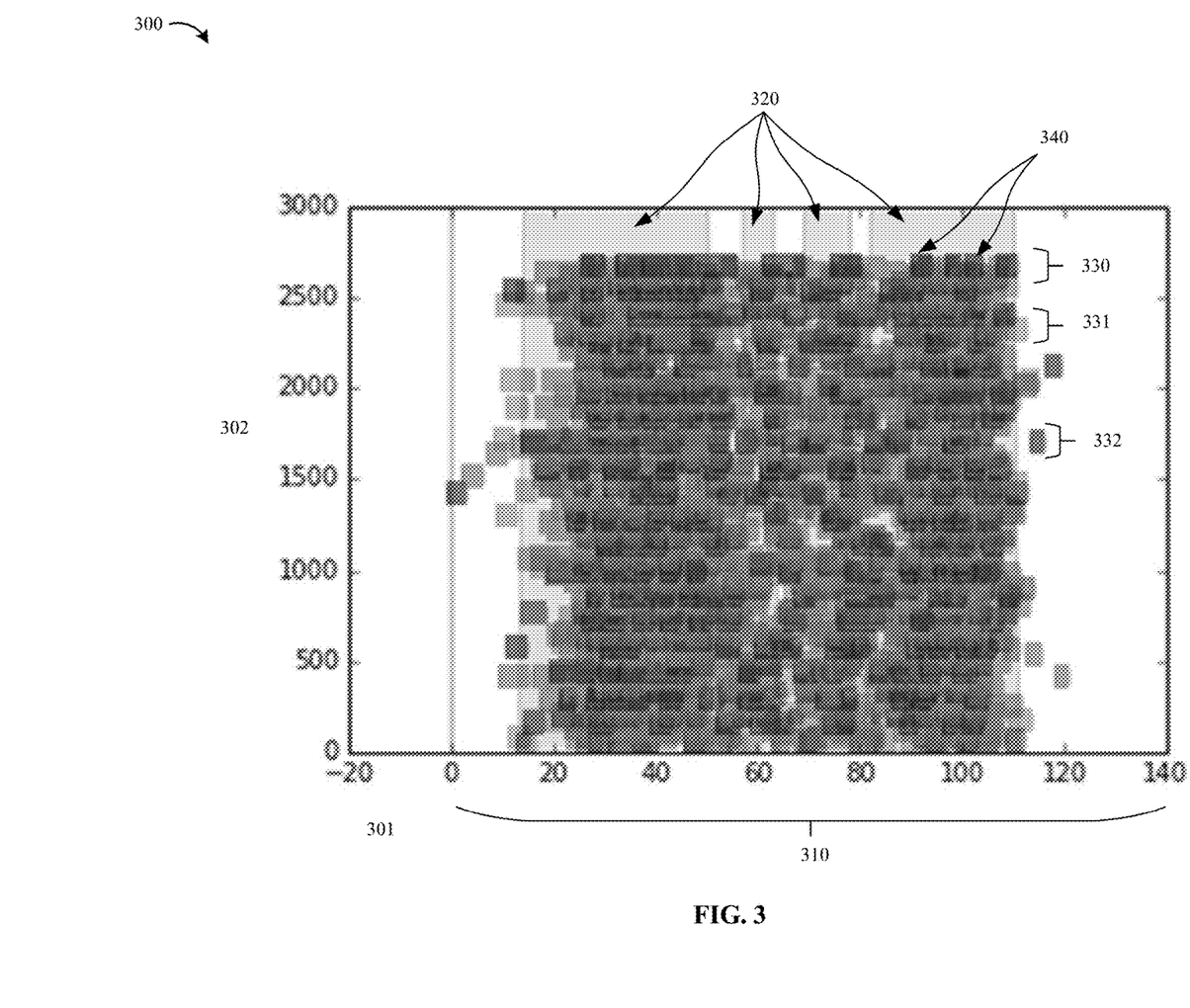
FIG. 3 is a graph illustrating positional relationships between collected data sets of detected objects of a street segment and known parking regions before a correction according to an example embodiment of the present invention.

Referring to FIG. 3, graph 300 illustrates positional relationships between sets of data collected by ascertaining vehicles traveling down street segment 310 and known parking regions 320. Graph 300 includes horizontal axis 301 representing positions along a longitudinal extension of street segment 310, and along which positions of detected objects are plotted and along which positions of five parking regions 320, illustrated as shaded regions positioned along street segment 310, are plotted. Graph 300 also includes vertical axis 302 corresponding to particular detected object distributions 330, 331, 332, etc. that are each obtained by a respective detecting vehicle traveling down street segment 310, where each different position along the vertical axis corresponds to a respective one of the detecting vehicles. That is, the shaded rectangles, e.g., 340, shown in FIG. 3 that have the same vertical axis 302 value correspond to data collected by a single ascertaining vehicle traveling down street segment 310. Each rectangle of each detected object distribution 330, 331, 332, etc. represents an object 340 detected while the ascertaining vehicle travels down street segment 310. As shown in FIG. 3, each object 340 includes position data corresponding to horizontal axis 301 with respect to street segment 310.

It may be assumed that a pattern of a distribution of objects 340 detected along street section 310 closely corresponds to a pattern of vehicles parked in allowed parking regions. However, as shown in FIG. 3, uncorrected detected object distributions 330, 331, 332, etc. correspond to shifted versions of the pattern of parking regions 320. For example, in the case of distribution 330, an ascertaining vehicle passed by a street and detected 8 blocks of objects. These may be a series of parked cars, sometimes detected as a single long object because the cars were parked too close together. At around 60 and then 70 meters, there are respective empty spaces between parked cars that would initially, without correction, be interpreted as available parking spaces, since these detections are localized within allowed parking regions of the parking map that defines parking regions 320. However, those empty spaces in fact correspond to driveways where parking is impermissible because the localization of the detections (correlation of detections to real space areas) is slightly inaccurate, and the detected empty spaces in fact are, in contrast to the detected locations, at about 55 and 65 meters into the street segment, which the parking map identifies as impermissible for parking.

It may be assumed that the shift in the pattern of detected objects from the pattern of the parking regions 320 is primarily caused by localization errors. To correct the localization error, each detected object distribution 330, 331, 332, etc. can be shifted so as to best ensure that the objects of each detected object distribution 330, 331, 332, etc. occupy the more likely positions, i.e., objects 340 that have been detected are shifted so that their patterns more closely correspond to the pattern of the known parking regions 320.

Figure 4:
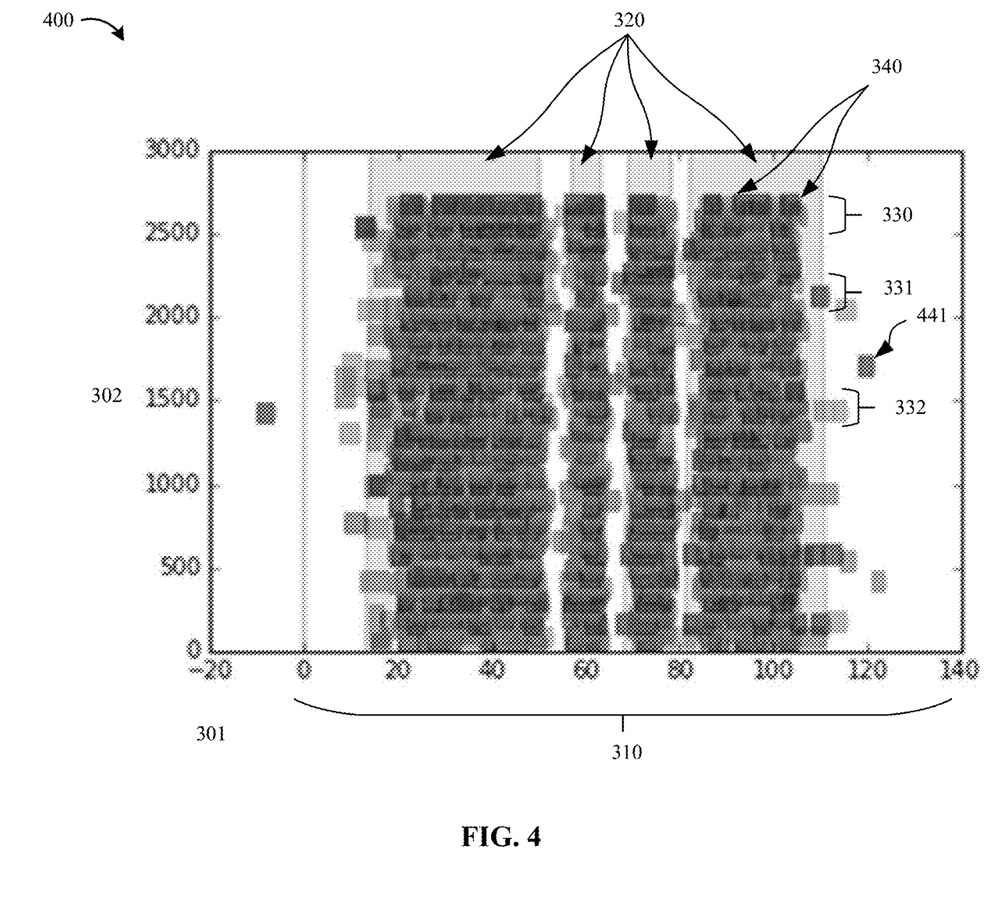
FIG. 4 is a graph illustrating the positional relationships between the collected data sets of the detected objects of the street segment and the known parking regions after a correction according to an example embodiment of the present invention.

As shown in FIG. 4, graph 400 illustrates positional relationships of data collected by ascertaining vehicles traveling down street segment 310 and known parking regions after the detected object distributions have been shifted. As shown in FIG. 4 and as compared to graph 300, parking regions 320 become more apparent after shifting object distributions 330, 331, 332, etc. and objects 340. Furthermore, objects outside of allowed parking regions, i.e., object 441, if detected as being a parked vehicle, can be confidently described as spurious detections.

After the correction, many of the open areas that, prior to the correction, would have been identified as available for parking because they were localized to regions identified in the parking map in which parking is permissible, are now identified as correlating to regions of the parking map identified as impermissible for parking. For example, FIG. 3 shows that distribution 330 includes two objects (the very long set of cars beginning at around 30 meters and ending at about 60 meters as well as the short one just past 60 meters initially cross into non-parking regions. The correction shifts all the car detections until a best shift is obtained to accommodate all vehicle detections of an ascertaining vehicle within legal parking areas 320 identified in the parking map, resulting in the corrected distribution of FIG. 4. Perfect accommodation is not always possible, and therefore example embodiments find a best accommodation that most closely correlates to the parking region distribution of the parking map, for example using a score function.

Thus, by using the model to shift the detected vehicles to match the permissible parking area distribution of the parking map, the detected open spaces are similarly shifted, resulting in a more accurate determination of where there are available parking spots, i.e., where corrected detected unoccupied areas overlap regions identified in the parking map as permissible for parking.

Thus, the system then applies the same model, determined from the correlation of the detected objects (e.g., parked cars) to the parking map, to shift the areas detected as being unoccupied, and therefore shifting the areas identified as being available for parking, as these are limited to the shifted unoccupied spaces that overlap a region 320 identified in the parking map as permissible for parking. That is the unoccupied spaced with corrected localization can then be compared to the regions 320 of the parking map and a more accurate decision is then made as to whether those detected unoccupied spaces are indeed valid parking spaces or are false positives that correspond to a driveway or intersection.

In an example embodiment, a two parameter model can be used to shift all of the detections from each detected object distribution 330, 331, 332, etc. In an example embodiment, the shifting function for performing the correction includes a barrier making it more difficult to obtain shifts that result in localizations of objects outside of the street segment. For example, in an example embodiment, a score function is used which includes a large penalty against shifts resulting in such localizations, to minimize or disallow shifts that are so large as to relocate detected objects from the street segment to outside the street segment.

In an example embodiment, shifting the detections can be performed as a minimization calculation. For example, using a score function, a score can be assigned to each detected object distribution, and the detected object distributions are shifted until the score function has been minimized.

In an example embodiment, the score function can be constructed as follows. First, the allowed parking regions are transformed into a histogram having a length L, which corresponds to the length of the particular street segment. The height of the histogram is set to one (1) inside allowed parking regions and zero (0) outside allowed parking regions. The bin width of the histogram, for example, can be set to one (1) meter. In a similar manner, the detected object distribution from a single ascertaining vehicle traveling down the street segment can be transformed into a histogram having a length L, corresponding to the length of the particular street section, and having a height set to one (1) for detected objects and zero (0) where no object is detected. The score function can then be described as the normalized root square difference between the parking region histogram and the detected object histogram. For example:

$$\text{Score} = \Sigma \frac{(T_i - O_i)^2}{L}.$$

Where the score is calculated over the entire length of the street segment, $T_i$ is the i-th bin from the parking region histogram, and $O_i$ is the corresponding bin from the detected object histogram.

For example, if a street segment has a length L and 1 meter bins are utilized, then the sum will be over L bins. If all vehicles in the street segment are detected fully within allowed parking regions, the score would be zero (0).

There are multiple ways for modeling the shift. For example, a model with few parameters can be used. For example, a shifted position of an object ($x_{shift}$) can be a function of the object's original position (x) as well as the parameters of an example model ($a_i$) the values of the coefficients of which are determined by minimization for best fit of the detection pattern to the model. For example, is a model is $x_{shift}=a_0+a_1*x$, then a respective set of values for $a_0$ and $a_1$ can be determined for application to all detections of the respective single drive to shift the detection positions, but $a_0$ and $a_1$ would be recalculated for subsequent drives and detections.

However, whenever a vehicle executes a turn, an odometry correction of the GPS can improve localization since it can tell that the vehicle is at an intersection. Therefore, the longer the vehicle drives straight, the more error can accumulate without such an odometry correction. Thus, according to an example embodiment of the present invention, instead of a model with a constant shift, which does not account for changes in the amount by which the detected object distribution is expected to vary from the allowed parking areas map as the distance from an intersection (at which turns can be made) increases, a model is used that advantageously allow for a steady growth of the error. Thus, many types of functions can potentially be used for the positional correction. In practice, it has been found that a low-order polynomial works well. In the example shown, however, a linear model is assumed.

In an example embodiment, to prevent large shifts from occurring, a ground truth histogram can be padded with high values outside the boundary of the allowed parking regions, so that the score function explodes if too high a shift is added. For example, as noted above, very large shifts can result in shifting a detected object to outside of the street segment, but the padding can help prevent such shifts resulting in the shifting of detected objects to outside the relevant street segment.

Additionally, this can help keep the corrected distribution to most closely correspond to the original distribution. For example, if a street segment is very empty, then there are only few parked vehicles to use for determining the best shift. As a result, many level of shifting can provide equally good match results. For example, 0, −10, and 30 feet shifts might all result in a pattern match. Thus, in an example embodiment, the algorithm gives preference to smaller shifts, so that, all things being equal, the detection distributions remains in their original form to the extent possible or as close to their original form to the extent possible, while still obtaining a best match. For example, in an example embodiment, a regularization term is added to the score function. Multiple methods of regularization are possible. As an example, a L2 regularization, i.e., a Ridge Regression, can be used, where $Score_{regularization}=Score+\lambda x^2$ and where $\lambda$, controls the amount of regularization desired and is empirically calibrated.

In an alternative example embodiment, a ground truth parking area map is initially unavailable. Instead, a detected object distribution collected from a signal ascertaining vehicle is compared and shifted based on historical detected object distributions. That is, the detected object distributions obtained over time are shifted to more closely resemble the mean/median/mode or other statistic representing the more typical pattern of detections.

There are instances where detected object distributions are not available. For example, some OEMs do not wish to share detections of parked cars, but only provide the presumed available parking space detections after the OEMs' proprietary calculation. Such output may include false positives, but because the object distribution has not been provided, a shift, as described above, by model matching object detections to a predefined parking map of permissible parking regions cannot be performed precisely as described above. Thus, according to an example embodiment of the present invention, the model matching based shifting is performed by pattern matching certain types of indicated unoccupied spaces. In this regard, some types of open space detections are most likely within allowed parking space regions. For example, driveways in a residential area are around 10 feet long for single car garages and approximately twice as long for two car garages. A detection of an open space 5 feet across is therefore very likely a parking space between two parked cars and not a driveway. Thus, according to an example embodiment, the pattern shifting is performed using the detected small unoccupied spaces, shifting them into regions 320.

It is also possible to use long unoccupied spaces. If the system is reliable enough, it is assumed that driveways are nearly always detected. Hence, a shift can be performed to ensure that the set of parking space detections for the relevant street segment contains all of the driveways in that street segment.

Thus, in these instances, where detected object distributions are not available, but a free space distribution is available, the detected free spaces do not necessarily imply that space is located within an allowed parking region. The shifting correction is still possible, but the method is adapted to the length of the open space relative to the scene observed from the parking area map.

Thus, according to an example embodiment, for relatively short spaces, the system processes as follows. It is assumed that relatively short open spaces correspond to spaces between legally parked cars. The system compares locations of the short open spaces to a parking area map and improves localization by shifting the short spaces so as to best accommodate them within allowed parking regions. Cars and relatively long open spaces correspond to either a space in which parking is not allowed or to a space in which parking is allowed, or a combination of the two. For the relatively short free spaces, the approaches described above (i.e., using a known parking distribution and using a normalized histogram) can be used to improve localization by shifting the short spaces so as to best accommodate them within allowed parking regions.

For the long spaces, it is assumed that they include driveways and the system can perform a similar shift to ensure that the driveways are fully contained within some of the free space detections. Consider, for example, the oversimplified case of a street segment with 10 driveways and 1 open space. If these yield 11 detections, the detections can be shifted so that 10 of the detections maximally overlap the know driveways. The optimal shift is determined with a score function as described above.

Figure 5:
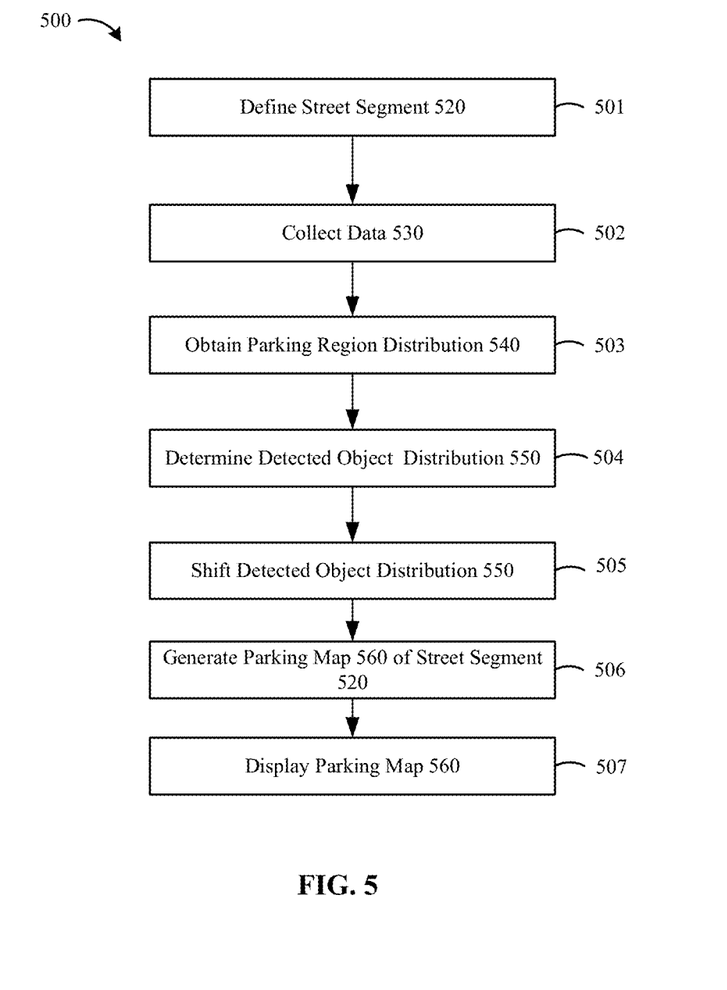
FIG. 5 is a flowchart illustrating a method for object detection localization according to an example embodiment of the present invention.

FIG. 5 is a flowchart of a method 500 for object detection localization. At step 501, street segment 520 is defined. For example, this can be a segment of predefined length and between intersections. At step 502, data 530 corresponding to objects detected in parking region 530 is collected over a period of time. Data 530 is collected from various sensors located on vehicles that travel through the parking region and can include information related to, inter alia, lengths of objects, heights of objects, and/or widths of objects. At step 503, parking region distribution 540, e.g., a predefined map of areas in which parking is permissible, is obtained. It is noted that the precise order of steps 501-503 is irrelevant.

Data 530 can be collected from one or more vehicles traveling in the same parking region. In this manner, data is collected over a period of time so as to establish a collection of data over the particular period of time corresponding to the particular parking region.

At step 504, a detected object distribution 550 is determined from the collected data. At step 505, the detected object distribution is shifted based on detected object distribution 550 and the obtained parking region distribution 540. At step 506, parking map 560 of available parking spots on street segment 520 is generated, and at step 507, parking map 560 is displayed using a display device. For example, parking map 560 can be generated using the shifted detected object distribution, which increases the accuracy of the positions of available parking spots, as shifting the detected objected distribution has increased the localization of detected objects and, with them, the determined available parking spots.

Figure 6:
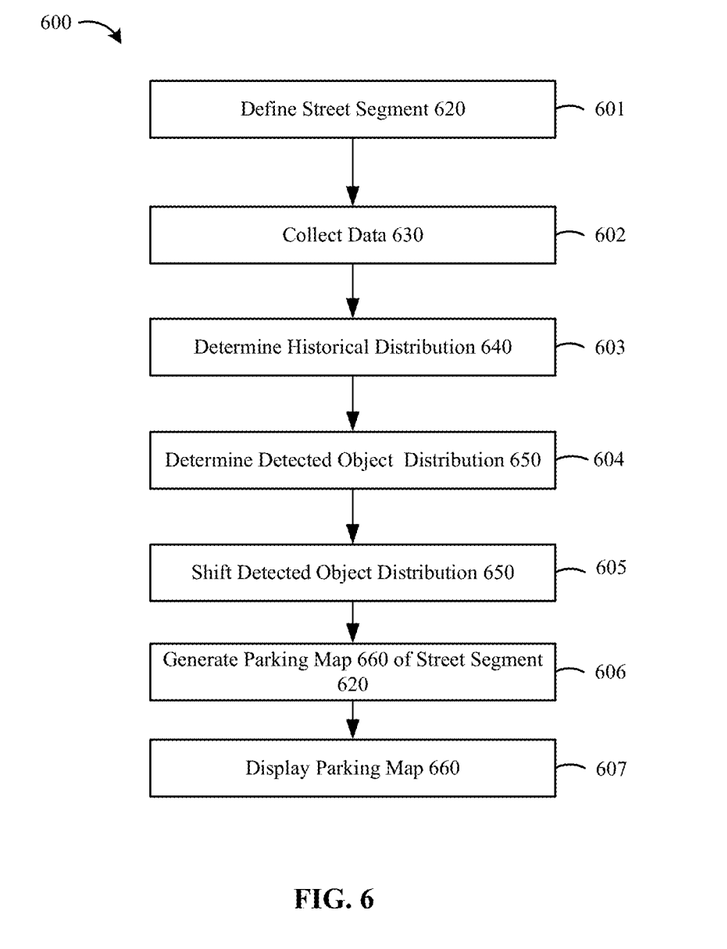
FIG. 6 is a flowchart illustrating another method for object detection localization according to an example embodiment of the present invention.

FIG. 6 is a flowchart of a method 600 for object detection localization. At step 600, street segment 620 is defined. At step 602, data 630 corresponding to objects detected in parking region 630 is collected over a period of time. Data 630 is collected from various sensors located on vehicles that travel through the parking region and can include information related to, inter alia, lengths of objects, heights of objects, and/or widths of objects. At step 603, historical distribution 640 is determined. Historical distribution 640 can be, for example, a normalized histogram of observed histograms determined based on detected object distributions collected over a specific period of time.

Data 630 can be collected from one or more vehicles traveling in the same parking region. In this manner, data is collected over a period of time so as to establish a collection of data over the particular period of time corresponding to the particular parking region.

At step 604, a new detected object distribution 650 is determined. At step 605, new detected object distribution 650 is shifted based on detected object distribution 650 and historical distribution 640. At step 606, parking map 660 of available parking spots on street segment 620 is generated, and at step 607, parking map 660 is displayed using a display device. For example, parking map 660 can be generated using the shifted detected object distribution, which increases the accuracy of the available parking spots, as shifting the detected objected distribution has improved the localization of detected objects, and with those, the localization of the available parking spots.

An example embodiment of the present invention is directed to processing circuitry, e.g., including one or more processors, which can be implemented using any conventional processing circuit and device or combination thereof, e.g., a Central Processing Unit (CPU) of a Personal Computer (PC) or other workstation processor, to execute code provided, e.g., on a non-transitory computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to a plurality of ascertaining vehicles that detect, and transmit to a server, information concerning objects detected in a parking region, where the server accumulates the detected object data and uses the accumulated data to generate a map of presently available parking spots.

The server can transmit the map to the plurality of ascertaining vehicles, to a user terminal, for example, a desktop, laptop, hand-held device, Personal Digital Assistant (PDA), television set-top Internet appliance, mobile telephone, smart phone, etc., to an additional server, and/or to additional vehicles. The ascertaining vehicle, user terminal, other vehicles or server can then display the map using a display device.

An example embodiment of the present invention is directed to one or more non-transitory computer-readable media, e.g., as described above, on which are stored instructions that are executable by a processor and that, when executed by the processor, perform the various methods described herein, each alone or in combination or sub-steps thereof in isolation or in other combinations.

An example embodiment of the present invention is directed to a method, e.g., of a hardware component or machine, of transmitting instructions executable by a processor to perform the various methods described herein, each alone or in combination or sub-steps thereof in isolation or in other combinations.

The above specification and examples provide a description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown can include some or all of the features of the depicted embodiment. For example, elements can be omitted or combined as a unitary structure, and/or connections can be substituted. Further, where appropriate, aspects of any of the examples described above can be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not to be interpreted as including means-plus- or step-plus-function limitations, unless such a limitation is explicitly recited in a given claim using the phrase(s) "means for" or "step for," respectively.

What is claimed is:

1. A method for parking spot localization, the method comprising:
   receiving, by processing circuitry and from at least one ascertaining vehicle driving through a street segment, data from at least one sensor of the at least one ascertaining vehicle corresponding to detected objects in the street segment;
   determining, by the processing circuitry, a detected object distribution based on the received data;
   shifting, by the processing circuitry, the detected object distribution based on a predefined parking region distribution and the detected object distribution; and generating, by the processing circuitry, a parking map of available parking spots on the street segment based on the shifted detected object distribution;

wherein:
(I) the parking region distribution is a histogram having:
(1) a bin width (W);
(2) a length (L) corresponding to a length of the street segment;
(3) a height of one (1) inside allowed parking regions; and
(4) a height of zero (0) outside allowed parking regions; and/or
(II) the method further comprises the processing circuitry calculating, based on a score function, a score corresponding to the parking region distribution and the detected object distribution, the shift of the detected object distribution is based on a minimization of the calculated score, the method further comprises the processing circuitry calculating a regularized score corresponding to the parking region distribution and the detected object distribution, and the regularized score is calculated using a Ridge Regression model.

2. The method of claim 1, wherein the receiving of the data, the determining of the detected object distribution, and the shifting of the detected object distribution are performed each time at least one of the at least one ascertaining vehicle drives through the street section.

3. The method of claim 1, wherein the data are ascertained using distance sensors situated on the at least one ascertaining vehicle.

4. The method of claim 1, wherein the detected object distribution is a second histogram having 1) the bin width (W); 2) the length (L) corresponding to the length of the street segment; 3) a height of one (1) where an object is detected; and 4) a height of zero (1) where no object is detected.

5. The method of claim 4, wherein:
the method comprises the calculation of feature (II) of calculating, based on the score function, the score corresponding to the parking region distribution and the detected object distribution;
the score function is defined as $$\Sigma \frac{(T_i - O_i)^2}{L};$$

$T_i$ represents an i-th bin from the parking region histogram;
$O_i$ represents an i-th bin from the detected object histogram;
L represents the length of the street segment; and
the score function is calculated over the length of the street segment.

6. The method of claim 4, wherein the bin width is equal to 1 meter.

7. A method for parking spot localization, the method comprising:
receiving, by processing circuitry and from at least one ascertaining vehicle driving through a street segment, data from at least one sensor of the at least one ascertaining vehicle and corresponding to detected objects in the parking region;

determining, by the processing circuitry, a detected object distribution based on the received data;
shifting, by the processing circuitry, the detected object distribution based on a historical distribution of objects detected in the street segment and a predefined parking region distribution; and
generating, by the processing circuitry, a parking map of available parking spots on the street segment based on the shifted detected object distribution;
wherein:
(I) the parking region distribution is a histogram having:
(1) a bin width (W);
(2) a length (L) corresponding to a length of the street segment;
(3) a height of one (1) inside allowed parking regions; and
(4) a height of zero (0) outside allowed parking regions; and/or
(II) the method further comprises the processing circuitry calculating, based on a score function, a score corresponding to the parking region distribution and the detected object distribution, the shift of the detected object distribution is based on a minimization of the calculated score, the method further comprises the processing circuitry calculating a regularized score corresponding to the parking region distribution and the detected object distribution, and the regularized score is calculated using a Ridge Regression model.

8. The method of claim 7, wherein the shifting of the detected object distribution is performed each time at least one of the at least one ascertaining vehicle drives through the street section.

9. A system for parking spot localization, the system comprising:
processing circuitry, wherein the processing circuitry is configured to perform the following:
receive, from at least one ascertaining vehicle driving through a street segment, data from at least one sensor of the at least one ascertaining vehicle corresponding to detected objects in the street segment;
determine a detected object distribution based on the received data;
shift, by the processing circuitry, the detected object distribution based on a parking region distribution and the detected object distribution; and
generate, by the processing circuitry, a parking map of available parking spots on the street segment based on the parking region distribution and the shifted detected object distribution;
wherein:
(I) the parking region distribution is a histogram having:
(1) a bin width (W);
(2) a length (L) corresponding to a length of the street segment;
(3) a height of one (1) inside allowed parking regions; and
(4) a height of zero (0) outside allowed parking regions; and/or
(II) the processing circuitry is configured to calculate, based on a score function, a score corresponding to the parking region distribution and the detected object distribution, the shift of the detected object distribution is based on a minimization of the calculated score, the processing circuitry is configured to calculate a regularized score corresponding to the parking region distribution and the detected object distribution, and the regularized score is calculated using a Ridge Regression model.

10. The server system of claim 9, wherein the receipt of the data, the determining of the detected object distribution, and the shifting of the detected object distribution are performed each time at least one of the at least one ascertaining vehicle drives through the street section.

11. A non-transitory computer-readable medium on which are stored instructions that are executable by a computer processor and that, when executed by the processor, cause the processor to perform to perform a method for parking spot localization, the method comprising:

receiving, from at least one ascertaining vehicle driving through a street segment, data from at least one sensor of the at least one ascertaining vehicle corresponding to detected objects in the street segment;

determining, by the processing circuitry, a detected object distribution based on the received data;

shifting, by the processing circuitry, the detected object distribution based on a parking region distribution and the detected object distribution; and     generating, by the processing circuitry, a parking map of available parking spots on the street segment based on the parking region distribution and the shifted detected object distribution;

wherein:

(I) the parking region distribution is a histogram having:

(1) a bin width (W);

(2) a length (L) corresponding to a length of the street segment;

(3) a height of one (1) inside allowed parking regions; and         (4) a height of zero (0) outside allowed parking regions; and/or     (II) the method further comprises the processing circuitry calculating, based on a score function, a score corresponding to the parking region distribution and the detected object distribution, the shift of the detected object distribution is based on a minimization of the calculated score, the method further comprises the processing circuitry calculating a regularized score corresponding to the parking region distribution and the detected object distribution, and the regularized score is calculated using a Ridge Regression model.

\* \* \* \* \*